United States Patent [19]
Ramirez

[11] 3,939,367
[45] Feb. 17, 1976

[54] MAGNETICALLY ACTUATED RECIPROCATING ENGINE

[76] Inventor: Juan A. Ramirez, 513 E. 224th St., Carson, Calif.

[22] Filed: Aug. 4, 1975

[21] Appl. No.: 603,027

[52] U.S. Cl. ................................. 310/20; 310/27
[51] Int. Cl.² ....................................... H02K 7/06
[58] Field of Search ............ 310/20, 23, 24, 27, 32, 310/34, 35

[56] References Cited
UNITED STATES PATENTS

| | | | |
|---|---|---|---|
| 538,351 | 4/1895 | Sabin | 310/35 X |
| 1,436,245 | 11/1922 | Geisler | 310/24 |
| 1,833,914 | 12/1931 | Ruben | 310/20 |
| 1,886,040 | 11/1932 | Moodyman | 310/24 |
| 2,338,005 | 12/1943 | Morch | 310/24 |
| 3,469,163 | 9/1969 | Mathews | 310/27 X |
| 3,575,649 | 4/1971 | Mathews | 310/27 X |
| 3,579,000 | 5/1971 | Mathews | 310/27 X |

Primary Examiner—Donovan F. Duggan

[57] ABSTRACT

A permanent magnet and an electromagnet actuated mechanical unit that may be secured to an engine block assembly to actuate at least one piston, connecting rod, and drive shaft that forms a part of the assembly to obtain rotary power.

6 Claims, 5 Drawing Figures

MAGNETICALLY ACTUATED RECIPROCATING ENGINE

BACKGROUND OF THE INVENTION

1. Field of the Invention

A magnetically actuated reciprocating engine.

2. Description of the Prior Art

In the past, reciprocating engines have been driven by charges of an air-fuel mixture being sequentially ignited, and with consequent pollution of the ambient atmosphere by exhaust gases resulting from the ignition of the air-fuel mixtures being discharged thereto.

The primary purpose of the present invention is to supply a magnetically actuated assembly that may be mounted on a reciprocating engine to power the latter, and eliminate the discharge of polluting gases to the ambient atmosphere.

SUMMARY OF THE INVENTION

The present invention is a magnetically actuated unit that is removably mountable on the block of an internal combustion engine, which block includes a crank case, at least one cylinder, a piston clidably mounted in the cylinder, a connecting rod extending between the piston and a crankshaft that is rotatably supported in the crank case, and a flywheel that is mounted on the crankshaft.

The magnetically actuated unit includes a housing having a base in which a first opening is formed. A cylindrical side wall extends upwardly from the base, with the upper open end of the side wall being closed by a top. The housing is removably secured to the block by bolts or the like, with the first opening being in axial alignment with the cylinder.

First permanent magnets are arranged within the housing in circumferentially spaced relationship adjacent the cylindrical side wall. Second permanent magnets are situated within the housing and supported by a vertically adjustable rod. The first and second permanent magnets define an annulus shaped space therebetween. The adjacently disposed ends of the first and second magnets are of the same polarity and the annulus shaped space at all times has a magnetic field therein.

A cylindrical shell extends upwardly from the piston through the first opening. A pair of oppositely disposed parallel, elongate members extend upwardly from the shell through two openings in the top. The upper extremities of the elongate members are secured to a transverse yoke that slidably engages the rod.

The elongate members have a solenoid coil rigidly secured thereto, which coil may move upwardly and downwardly through the annulus shaped space. Commutation means are so operatively associated with the crankshaft that the solenoid coil is intermittently energized from a source of electric energy. The solenoid coil has upper and lower ends.

The magnetically actuated unit is started by initially manually or otherwise rotating the crankshaft to cause downward movement of the piston, and the solenoid coil that moves concurrently therewith. As the lower end of the solenoid coil approaches the magnetic field in the annulus shaped space, the commutation means effect an electric circuit between the source of electric energy and the solenoid coil. The direction of current flow of the circuit so established is in a first direction such that the lower end of the solenoid coil will have a polarity that tends to draw the solenoid coil into the annulus shaped space. This flow of electric current should continue until the solenoid coil has moved downwardly in the annulus shaped space until just before it assumes a locked position relative to the first and second magnets. At this position the commutation means breaks the electric circuit to the solenoid coil. The angular momentum imparted to the flywheel will cause the solenoid coil to continue moving downwardly in the annulus-shaped space. When the solenoid coil has moved downwardly in the annulus shaped space to the extent that the upper end of the solenoid coil is below the center of the magnetic field therein, the commutation means again energizes the solenoid coil, with the direction of current flow continuing to be in the same direction. The upper end of the solenoid coil is then of a polarity different from that of the magnetic field in the annulus shaped space, and the solenoid coil is forced downwardly.

This forceful movement of the solenoid coil results in the downward movement of the piston to rotate the crankshaft, for the solenoid coil is at all times a fixed distance from the piston. Momentum is imparted to the flywheel that causes rotation of the crankshaft and subsequent upward movement of the solenoid coil relative to the magnetic field in the annulus shaped space. As the upper end of the solenoid coil approaches the lower end of the magnetic field in the annulus shaped space, the commutation means again completes the electric circuit, but with the current flow being in a reverse direction. The polarity of the upper end of the solenoid coil is such that the solenoid coil tends to be drawn upwardly into the annulus shaped space. Just before the solenoid coil reaches a locked position in the annulus shaped space, the commutation means breaks the electric circuit. The solenoid coil, due to the momentum of the of the flywheel, continues to move upwardly in the annulus shaped space.

When the lower end of the solenoid coil has moved upwardly above the center of the magnetic field in the annulus shaped space, the commutation means again completes the electric circuit. The polarity of the lower end of the solenoid coil is such that the solenoid coil tends to be forced upwardly away from the magnetic field. Upon the lower end of the solenoid coil moving above the magnetic field, the commutation means again breaks the electric circuit. The momentum of the flywheel continues to keep the crankshaft rotating and the above described cycle is repeated.

DESCRIPTION OF THE PREFERRED EMBODIMENT

Figure 1:
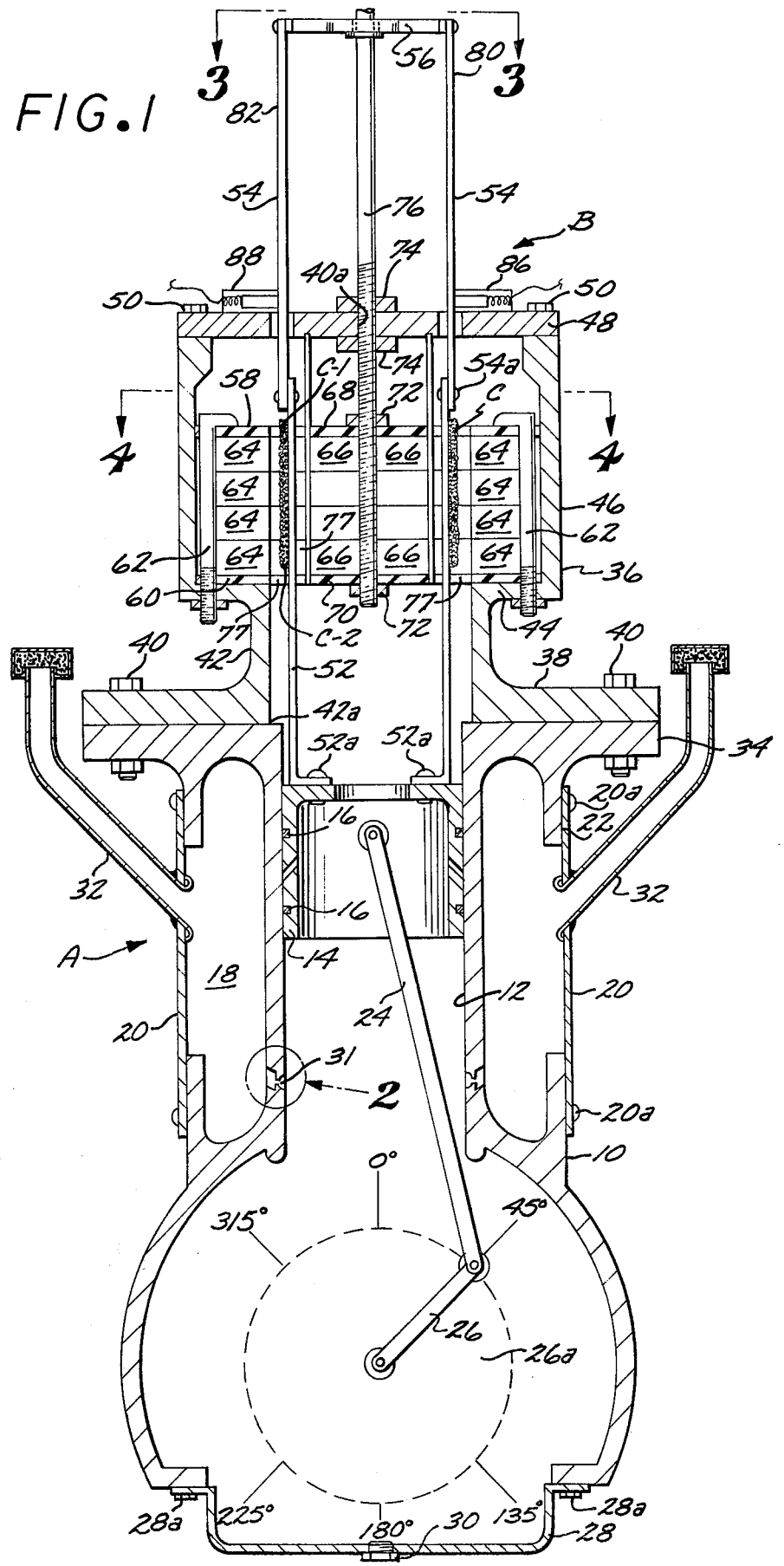
FIG. 1 is a vertical cross-sectional view of an engine block assembly with the magnetically actuated power unit removably secured thereto.

An engine block assembly A is shown in FIG. 1 that has the magnetically actuated power assembly B removably mounted thereon.

The engine block assembly A is of conventional design and includes a block 10 which has at least one cylinder 12 therein, and each cylinder 12 having a piston 14 slidably mounted within the confines thereof and sealingly engaging the cylinder by rings 16 mounted on the pistons. The block 10 is of such shape as to define an oil reservoir 18, with the reservoir being closed by a cover 20. Packing 22 seals the cover 20 to the block 10, and the cover being held on the block by first bolts 20a, or the like.

Figure 2:
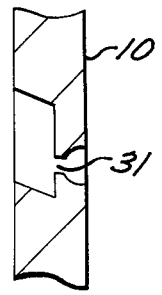
FIG. 2 is an enlarged vertical cross-sectional view of that portion of the engine block assembly within the circle shown in phantom line in FIG. 1 and identified by the numeral 2.

Each piston 14 has a connecting rod 24 pivotally secured thereto, with the connecting rod being pivotally connected to a crankshaft 26 situated within the block 10. The block 10 includes an oil pan 28 that has a drain plub 30 in the lower portion thereof, with the oil pan 28 being secured to the block by second bolts 28a, or the like. The oil reservoir 18 is at all times in communication with the interior of the portion of the block defining the crank case, due to ports 31, as best seen in FIGS. 1 and 2.

The magnetically actuated power assembly B includes a housing 36 which has a flange 38 that is removably secured to the upper portion 34 of block 10 by a number of third bolts 40. The housing 36 includes a tubular portion 42, which on the upper end thereof develops into an outwardly extending web 44. On the outer extremity thereof the web 44 develops into a cylindrical side wall 46 that extends outwardly, as may best be seen in FIG. 1. A top 48 is provided that is secured to the upper extremity of the side wall 46 by bolts 50. A cylindrical shell 52 is secured to the upper portion of the piston 14 by screws 52a, or the like, as can best be seen in FIG. 1.

Two vertical, oppositely disposed rods 54 are secured to the upper portion of the shell 52 by bolts, rivets, or the like 54a, and the rods on the upper ends thereof being secured to a yoke 56. First and second clamp plates 58 and 60 are engaged by bolts 62, which bolts extend through openings in the web 44, and the bolts when tightened serving to force the first and second clamping plates into pressure contact with a number of radially extending, circumferentially spaced, first magnets 64 that are situated within the confines of the cylindrical side wall 46.

A number of second permanent magnets 66 are provided that are radially aligned with the first magnets 64, with the second magnets being held in fixed positions due to being situated between first and second clamp members 68 and 70. Nuts 72 threadedly engage a partially threaded rod 76 to hold the clamp members 68 and 70 in a fixed magnet clamping position on the rod. The threaded portion of rod 76 engages a tapped bore 48a in top 48. A pair of lock nuts 74 engage the threaded rod 76 to adjustably hold the rod and first magnets 66 at a desired longitudinal relationship with first magnets 64. The adjacent ends of the first and second magnets 64 and 66 are of the same polarity and at all times maintain a magnetic field in a space 77 defined therebetween. The yoke 56 slidably engages an unthreaded portion of the rod 76.

Figure 3:
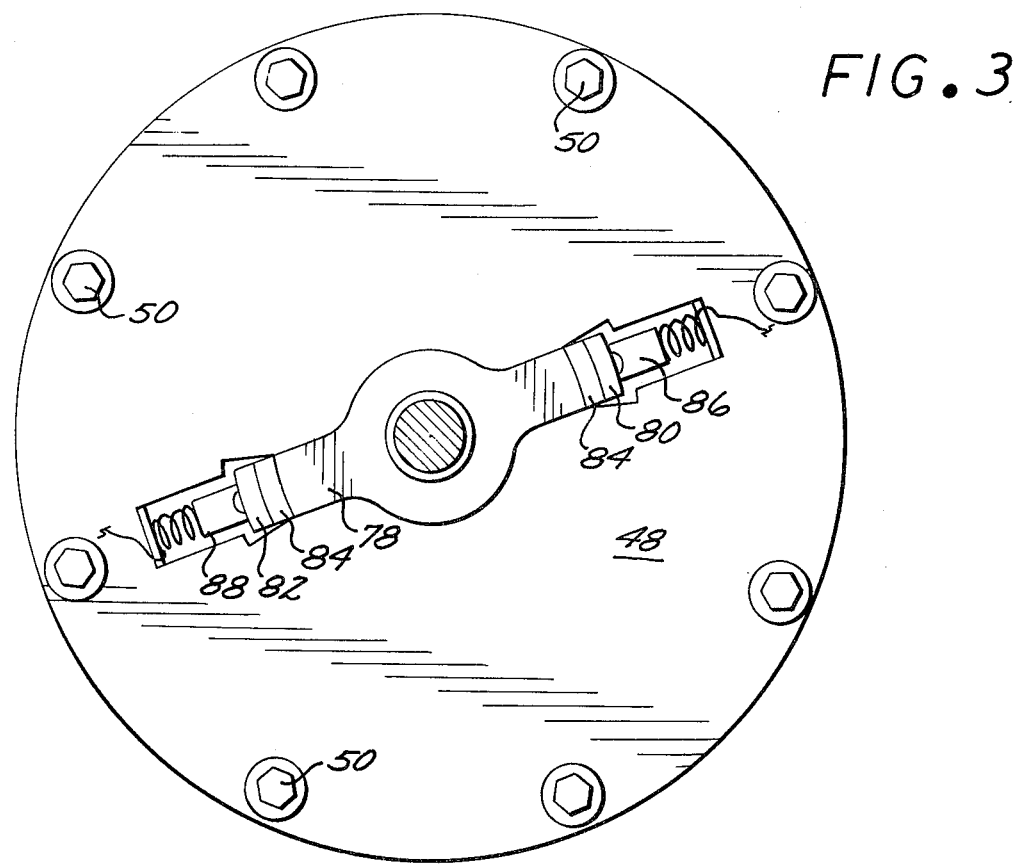
FIG. 3 is a top plan view of the magnetically actuated power assembly, taken on the line 3—3 of FIG. 1.
Figure 4:
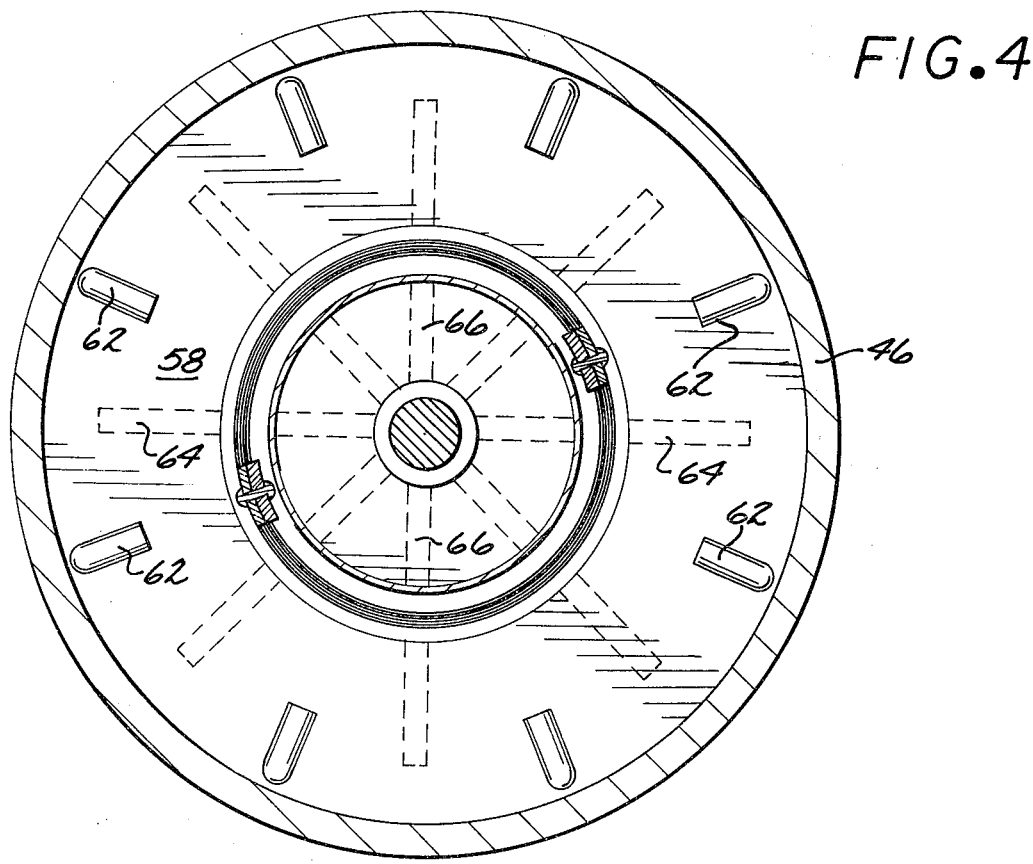
FIG. 4 is a transverse cross-sectional view of the magnetically actuated power assembly, taken on the line 404 of FIG. 1.

First and second elongate rigid electrical conductors 80 and 82 are secured to the rods 54, as may be seen in FIG. 3, and are electrically insulated therefrom by strips of insulation 84 that are bonded to the rods and to the members 80 and 82. First and second spring-loaded brushes 86 and 88 are mounted on the top 48, as shown in FIG. 1, with the brushes 86 and 88 at all times being in engagement with conductors 80 and 82 as the latter reciprocate upwardly and downwardly as will later be explained in detail.

A solenoid coil C having an upper end C-1 and lower end C-2 is mounted on the shell 52, as can be seen in FIG. 1, and in certain portions of the cycle of rotation of the crankshaft 26, the solenoid C moves into and out of the magnetic field in space 77.

First and second commutator assemblies D-1 and D-2 are mounted on a shaft 96 that rotates concurrently with crankshaft 26 and at the same rate of rotation. First assembly D-1 includes a first cylindrical spool 78 formed of an electrical insulating material that supports first, second, third and fourth longitudinally spaced, electrical conducting arcuate segments 100, 102, 104 and 106. Segments 100, 102, 104 and 106 are engaged by first, second, third and fourth carbon brushes 100a, 102a, 104a and 106a. First and second segments 100 and 102 are connected by a conductor 108, and the segments 104 and 106 by conductor 110.

Figure 5:
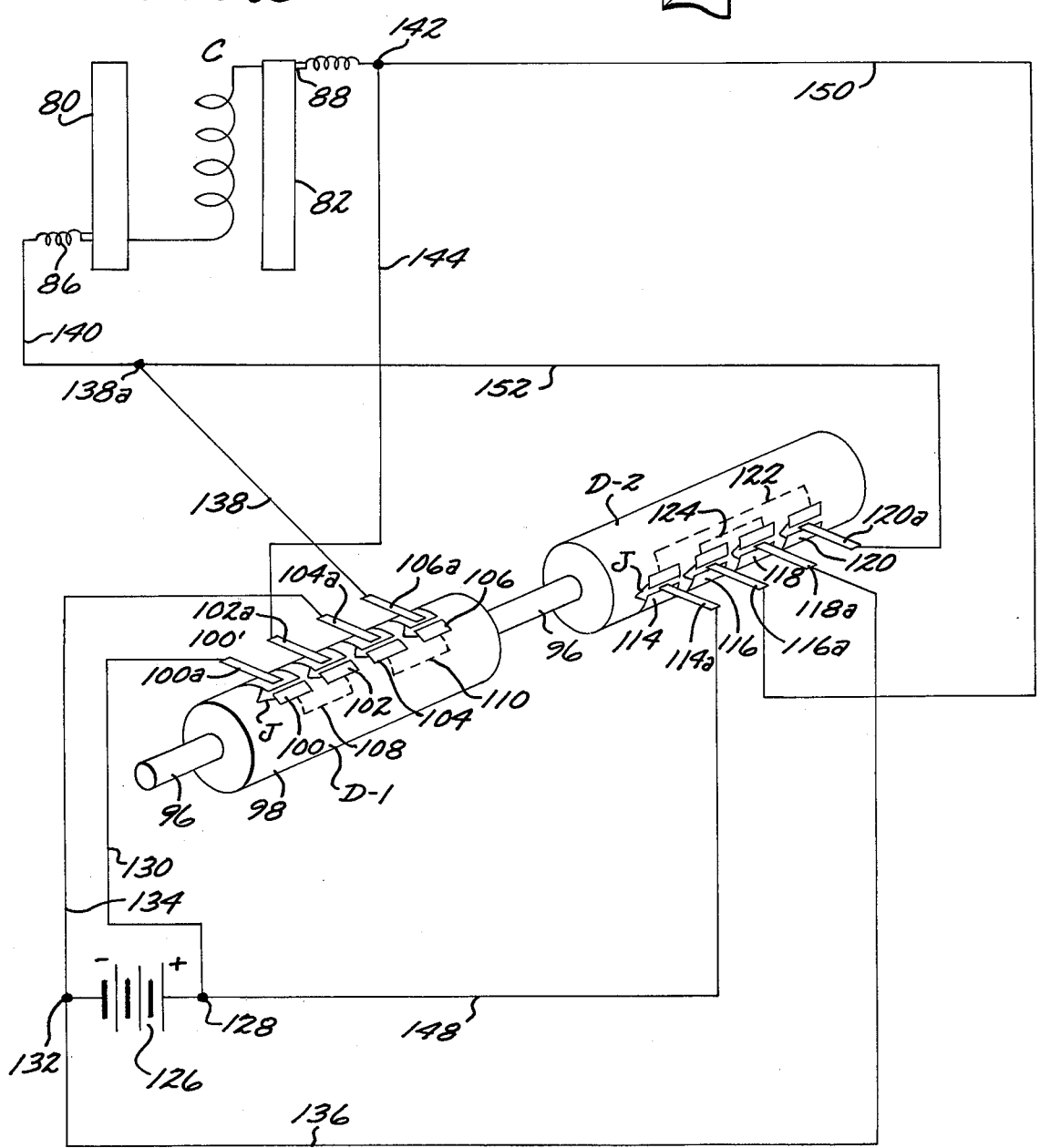
FIG. 5 is a diagrammatic view of the electric circuit used in conjunction with the magnetically actuated power assembly.

A second spool D-2, which is formed from an electrical insulating material, is connected to the shaft 96 and rotates concurrently therewith. The second spool 112, as may be seen in FIG. 5, has 5th, 6th, 7th and 8th longitudinally spaced, circumferentially extending commutator segments 114, 116, 118, 120 mounted thereon. Fifth, sixth, seventh and eighth commutator segments 114, 116, 118 and 120 are engaged by fifth, sixth, seventh, and eighth resilient brushes 114a, 116a, 118a and 120a. The fifth and eighth commutator segments 114 and 120 are connected by a conductor 122 and the sixth and seventh by a conductor 124. A source of electric power 126 has a first terminal 128 connected to first brush 120a by a conductor 130. A second terminal 132 of source of electricity 126 has two conductors 134 and 136 extending therefrom. Conductor 134 is connected to third brush 134a, with the fourth brush 106a being connected by a conductor 138 to a junction point 138a from which a conductor 140 extends to the first spring-loaded brush 86. The second spring-loaded brush 88, as may be seen in FIG. 5, is connected to a junction point 142 from which a conductor 144 extends to the second brush 102a. The first, second, third and fourth segments 100, 102, 104 and 106 are so disposed on the first spool D-1 that when the crankshaft 26 has rotated in a clockwise direction to 45° as shown in FIG. 1, contact is concurrently made with the first, second, third and fourth brushes 100a, 102a, 104a, and 106a in a clockwise direction.

During such contact an electric circuit to solenoid C is maintained from source of electricity 126 to second terminal 132, conductor 134, third brush 104a, third segments 104, conductor 110, fourth segments 106, fourth brush 106a, conductor 138, junction point 138a, conductor 140, first spring-loaded brush 86, first conductor strip 80, solenoid C, second conductor strip 82, second spring-loaded brush 88, junction 142, conductor 114, second brush 102a, second segment 102, conductor 103, first segment 100, first brush 100a, conductor 130, and first terminal 128. The flow of current so established is in such a direction that the magnetic field generated by the solenoid C will tend to move solenoid C in space 77 towards a locked position therein. Just prior to the locked position being reached, the segments 100, 102, 104, and 106 rotate out of contact with brushes 100a, 102a, 104a and 106a. The momentum imparted to flywheel 26 will keep crankshaft 26a rotating. When solenoid C has moved downwardly in space 77 to the extent that the upper end C-1 of solenoid C is below the center of the magnetic field in space 77, the circuit to solenoid C is again established by brushes 100a, 102a, 104a and 106a which contact a second set of segments 100', 102', 104' and 106' which are identical to segments 100, 102, 104 and 106 but are spaced therefrom. Segments 100', 102', 104' and 106' are connected to segments 100, 102, 104 and 106 by conductors J situated within the interior of spool D-1. End C-1 of solenoid C has such polarity that the solenoid is forced downwardly.

This downward movement of solenoid C will continue until the upper end C-1 is below the magnetic field in space 77. At that point the electric circuit to solenoid C is broken by segments 100', 102', 104' and 106' which rotate out of contact with brushes 100a, 102a, 104a and 106a. As crankshaft 26 continues to rotate and solenoid C move upwardly, the direction of electrical current through the solenoid C is reversed as the upper end approaches the magnetic field in space 77 with the solenoid generating a magnetic field that tends to draw the solenoid upwardly towards a locked position in the space. The first terminal 128 of the source of electricity 126 has a conductor 148 extending therefrom to the fifth brush 114a. Sixth brush 116a is connected by a conductor 150 to junction point 142. The fifth, sixth, seventh and eighth segments 114, 116, 118 and 120 are so disposed on second spool D-2 that when the crankshaft is rotated to approximately 225° as viewed in FIG. 1, the segments are in engagement with fifth, sixth, seventh and eighth brushes and will so remain until the crankshaft has rotated to a position where the solenoid C is almost in a locked position in the magnetic field in space 26.

During the time the fifth, sixth, seventh and eighth segments 114, 116, 118, 120 are in engagement with the fifth, sixth, seventh and eighth brushes 114a, 116a, 118a and 120a, electric current flows from the source 126 through conductor 136, seventh brush 118a, seventh segment 118, conductor 124, sixth segment 116, sixth brush 116a, conductor 150, junction point 142, second spring-loaded brush 88, conductor strip 82, solenoid C, second conductor strip 80, first spring-loaded brush 86, conductor 140, junction point 138a, conductor 152, eighth brush 120a, eighth segments 120, conductor 122, fifth segment 113, fifth brush 114a, conductor 148 to first terminal 128 of a source of electricity 126.

Just prior to the solenoid C moving upwardly in space 77 to the locked position, the electric circuit thereto is terminated, and after the lower edge C-2 of the solenoid has moved above the center of the magnetic field in space 77 the circuit is again completed by brushes 114a, 116a, 118a and 120a contacting segments 114', 116', 118' and 120' in the same manner as described in connection with the downstroke of solenoid C. The segments 114, 116, 118 and 120 and 114', 116', 118' and 120' are circumferentially spaced from one another on spool D-2 and connected internally by conductors J.

The spools D-1 and D-2 may be of split construction and the conductors 108, 110, 122 and 124 being situated within the confines of the spool but in engagement with the segments above described. When the current flow through the solenoid C in the direction last described the magnetic field generated by the solenoid tends to move the solenoid C and piston 14 upwardly.

When the engine is operating as above described, the momentum of the flywheel 26a causes the crankshaft 26a to continue to operate when the solenoid C is not electrically energized.

I claim:

1. In combination with a crankshaft, a flywheel connected to said crankshaft, a connecting rod pivotally connected to said crankshaft, a piston pivotally connected to said connecting rod, an engine block that rotatably supports said crankshaft and flywheel, said engine block having a cylinder therein in which said piston reciprocates when said crankshaft and flywheel rotate, a source of electric energy, a magnetically actuated device for driving said crankshaft, said device including:

a. a housing mounted on said block, with the interior of said housing in communication with said cylinder;

b. first and second permanent magnetic means situated in said housing that define an annulus shaped space therebetween that has a magnetic field therein, with the adjacent portions of said first and second magnetic means of the same polarity, and said annulus shaped space axially aligned with said cylinder;

c. a solenoid coil that may reciprocate in said annulus shaped space to positions thereabove and below, said solenoid coil having a first end that first enters said annulus shaped space when said solenoid coil moves downwardly relative thereto and a second end that first enters said annulus shaped space when said solenoid coil moves upwardly relative to said annulus shaped space;

d. first means that supports said solenoid coil at a fixed position relative to said piston; and e. commutation means for intermittently completing an electric circuit to said solenoid from said source of energy and reversing the direction of flow of current through said solenoid, said commutation means as said crankshaft and flywheel rotate to dispose said second end of said solenoid in a position to move into said annulus shaped space completing an electric circuit from said source of electric energy to said solenoid coil that imparts a magnetic polarity to said second end such that said solenoid tends to be pulled downwardly towards a locked position in said annulus shaped space, said commutation means just prior to said solenoid coil moving to said locked position breaking said electric circuit, said solenoid coil after said electric circuit has been broken continuing to move downwardly in said annulus shaped space due to momentum imparted to said flywheel, said solenoid coil after said first end thereof has moved downwardly in said annulus shaped space below the center of said magnetic field having said electric circuit thereto again completed to energize said solenoid coil for said first end thereof to have a polarity that tends to force said solenoid coil downwardly out of said annulus shaped space, said electric circuit to said solenoid coil being broken by said commutation means when said first end of said solenoid coil has moved downwardly out of said annulus shaped space, with the momentum imparted to said flywheel causing said crankshaft to rotate until said solenoid coil starts to move upwardly towards said annulus shaped space, and said commutation means intermittently completing said electric circuit in reverse order and with reverse current flow as said solenoid moves upwardly through said annulus shaped space.

2. A device as defined in claim 1 in which said first magnetic means is defined by a plurality of circumferentially spaced first magnets that define an opening in the interior thereof.

3. A device as defined in claim 2 in which said second magnetic means is defined by a plurality of circumferentially spaced second magnets that are disposed in said opening, and are radially aligned and spaced from said plurality of first magnets to provide said annulus shaped space therebetween.

4. A device as defined in claim 2 in which each of said first magnets is defined by a plurality thereof stacked one above the other.

5. A device as defined in claim 3 in which each of said second magnets is defined by a plurality thereof stacked one above the other.

6. A device as defined in claim 1 in which said first means is a cylindrical shell secured to said piston that has said solenoid coil mounted thereon in an encircling position.

* * * * *